(12) United States Patent
Lathrop

(10) Patent No.: US 6,597,359 B1
(45) Date of Patent: Jul. 22, 2003

(54) HIERARCHICAL SPACE SUBDIVISION HARDWARE FOR RAY TRACING

(75) Inventor: Olin Lathrop, Groton, MA (US)

(73) Assignee: Raychip, Inc., Devens, MA (US)

(*) Notice: Subject to any disclaimer, the term of this patent is extended or adjusted under 35 U.S.C. 154(b) by 0 days.

(21) Appl. No.: 09/573,529

(22) Filed: May 17, 2000

(51) Int. Cl.[7] .............................................. G06T 11/20
(52) U.S. Cl. ....................... 345/440; 345/420; 345/423; 345/424; 345/619; 345/645
(58) Field of Search ................................ 345/423, 424, 345/420, 440, 619, 645, 426

(56) References Cited

U.S. PATENT DOCUMENTS

| | | | |
|---|---|---|---|
| 4,945,500 A | 7/1990 | Deering | |
| 5,394,516 A | 2/1995 | Winser | |
| 5,490,246 A | * 2/1996 | Brotsky et al. | |
| 5,583,975 A | 12/1996 | Naka et al. | |
| 5,594,844 A | 1/1997 | Sakai et al. | |
| 5,933,146 A | 8/1999 | Wrigley | |
| 6,088,035 A | * 7/2000 | Sudarsky et al. | |

* cited by examiner

Primary Examiner—Mark Zimmerman
Assistant Examiner—Kimbinh T. Nguyen
(74) Attorney, Agent, or Firm—Maine & Asmus

(57) ABSTRACT

The invention is a method and apparatus for a ray tracer incorporating major functions of ray tracing in hardware. The invention performs the hierarchical space subdivision technique of accelerating a ray tracer, statically or dynamically. The preferred embodiment is a fully recursive and dynamic system employing an octree hierarchy. The system utilizes hard-wired electronics instead of software, with the accompanying adjustments to better suite the hardware implementation. The invention also specifically claims caching of scene object descriptions, specific subdivision criteria, and other refinements.

21 Claims, 10 Drawing Sheets

Quadtree After 0 Generations

Quadtree After 1 Generation

Quadtree After 2 Generations

Quadtree After 5 Generations

R = ray origin
V = ray direction unit vector
P = point on ray to find full coordinates of
d = distance from ray origin to point P Given: R, V, $P_x$    Find: $P_y$, $P_z$ 35:  $P = dV + R$ 36:  $d = \dfrac{P_x - R_x}{V_x}$ 37:  $P_y = dV_y + R_y = \dfrac{P_x - R_x}{V_x}V_y + R_y = P_x\dfrac{V_y}{V_x} - R_x\dfrac{V_y}{V_x} + R_y$ 38:  $P_y = mP_x + a$ 39:  $m = \dfrac{V_y}{V_x}$    $a = R_y - mR_x$

HIERARCHICAL SPACE SUBDIVISION HARDWARE FOR RAY TRACING

BACKGROUND OF THE INVENTION

Technical Field of the Invention

This invention most generally relates to the process of rendering a synthetic image with a computer. More particularly, the present invention relates to an apparatus and process of ray tracing.

Background of the Invention

Ray Tracing

Ray tracing is one of several methods of rendering an image from a computer scene description. It is distinguished from other methods by the high quality of the resulting images, which can include shadows, reflections, and refractive effects.

FIG. 1 illustrates the basic concept behind ray tracing. In computer rendering, a bitmap of pixels 3 can be thought of as suspended a short distance in front of an eye point 1. The task of the renderer is to find the color value for each bitmap pixel that represents the light seen from the eye point coming from the scene in the direction of that pixel.

The ray tracing method accomplishes this for each pixel by tracing a ray from the eye point through that pixel into the scene, then determining the qualities of the light emanating from the scene backwards along the ray towards the eye point. Ray 2 in FIG. 1 is an example of this. Ray 2 is traced in the view direction corresponding to the center of the fourth pixel from the right in the third row down. The ray tracer performs some computations to eventually determine that the first scene object ray 2 intersects is sphere 4. The ray tracer then computes the light color and intensity reflected by the sphere backwards along the ray from the intersection point. This light color and intensity then becomes one data point of a known color value within the bitmap, in this case at the center of the fourth pixel from the right in the third row down.

The fundamental operation in a ray tracer is to find the apparent color and intensity of the light coming back along a ray. This is known as "tracing" the ray.

Ray Recursion

Note that this operation of tracing a ray does not require that the ray start at the eye point, or any other point. The name "eye ray" is commonly used to distinguish rays that originate at the eye point from those that originate elsewhere. The ability to find the light coming to any specific point from any specific direction is used inside the ray tracer to produce effects like shadows, refraction, and transparent objects.

FIG. 2 illustrates how a ray tracer might create and trace additional rays as part of the overall effort of tracing a single eye ray. As in FIG. 1, ray 2 is traced from the eye point 1. The first scene object intersected by ray 2 is the transparent object 5. The light seen from a point on a transparent object comes from two possible directions, the light reflected off the surface and the light transmitted through the object. The ray tracer creates and traces ray 6 to determine that portion of ray 2 resulting from the transmitted light, and ray 9 to determine the reflected portion. The result for ray 2 then becomes a weighted sum of the results for rays 6 and 9.

This process continues deeper. The value of ray 6 is a combination of the internal reflection, solved by tracing ray 8, and the transmitted light entering object 5, solved by ray 7. Ray 7 in turn strikes the reflective object 10, which requires tracing ray 11 in the direction the reflected light comes from. Meanwhile ray 9 intersects the opaque object 12. The light perceived backwards along ray 9 depends on the illumination at the point where ray 9 intersects object 12. Ray 13 is traced in a slightly different manner to determine whether the light 14 shines on the point on object 12 or whether the light is occluded by another object. In this case no object occludes the light, and light 14 is therefore taken into account in determining the perceived light back along ray 9. If the light had been occluded, then it would not have been taken into account. This would have yielded the visual effect of the point on object 12 being in a shadow from light source 14.

Note that ray 13 is traced in a different manner. The ray tracer does not solve for the light coming back along the ray, but rather whether the ray makes it to the light source or not. This type of ray is commonly referred to as a "light ray".

Recursively launching additional rays as part of solving a previous ray is how ray tracers simulate many of the effects they are well known for. In FIG. 2, rays 9 and 11 provide the effect of reflective objects. Rays 6 and 7 provide transparency, ray 8 internal reflections, and launching light rays such as ray 13 provides for shadows.

Finding Ray/Object Intersections

Part of a ray tracer's job in tracing a ray is to determine which scene object, if any, is the first intersected by the ray. The simplistic approach is to check the ray against every object in the scene. While this works, it requires far too much computation to be a useful method. All "real world" ray tracers employ some sort of speedup technique aimed at eliminating unnecessary ray/object intersection checks.

There are two broad classes of techniques for reducing the number of ray/object intersection checks to perform. These are called "object hierarchy" and "space subdivision". The object hierarchy techniques group a set of objects together and find a simple bounding volume that encloses the whole group, like a sphere or a box. Rays are then intersected with the bounding volume. If the ray does not intersect the bounding volume then there is no need to check for intersection with the objects inside the bounding volume, since none of these objects could possibly intersect the ray.

The bounding volumes can also be arranged in a hierarchy. Thus, a bounding volume may contain scene objects and other bounding volumes. A scene may then consist of only a small number of bounding volumes at the top level. Intersection checks are only performed on the objects within a bounding volume if the ray is found to intersect that bounding volume.

Object hierarchy techniques vary from each other by how the objects within a bounding volume are chosen, the shape of the bounding volumes, how the bounding volumes are found, etc.

The space subdivision techniques subdivide the scene volume instead of the list of objects. The scene space is subdivided into chunks. The data for each chunk contains a list of all the scene objects that could result in a positive ray/object intersection check within the chunk. As a ray is traced, the chunk database is traversed in order along the ray. The ray is checked for intersection with all the objects in each chunk before proceeding to the next chunk along the ray. Only a small number of ray/object intersection checks are performed if the chunk only contains a small number of objects.

Space subdivision techniques can also be static or dynamic. In a static system, all the chunks are found and their object lists determined before any rays are traced. A dynamic system allows chunks to be created, deleted, and otherwise rearranged dynamically, driven by rays being traced through the scene. Static systems may require less overall computation to generate the chunks and their lists of objects since this is all done once up front. The chunks in static systems may also be more regular, thereby decreasing the computation required in determining the next chunk along a ray.

The main advantage of dynamic systems is that they only create complexity (requiring computation and memory) when and where it is needed, based on the ray activity and other criteria. For example, the space around a complex object behind a wall from the eye point may never be subdivided if no rays are traced behind the wall. Some static space subdivision techniques and generally all dynamic techniques are hierarchical. If an existing chunk is deemed too complex, it is subdivided into two or more sub-chunks. This process is repeated on the sub-chunks until they are no longer too complex to require subdivision, or some arbitrary subdivision limit has been reached.

An example of a static non-hierarchical technique is where the scene space is a parallelepiped broken into 32 by 32 by 32 chunks of equal dimensions. This requires only simple data structures and it is simple to step a ray from one chunk to the next. The disadvantage is when the objects in the scene are not uniformly distributed (which they usually aren't). In that case, some chunks may contain a large number of objects, while other parts of the scene space contain many abutting empty chunks that the ray must step through before the next intersection check is performed.

An example of a hierarchical technique is an octree. The scene space is a parallelepiped that starts out being a single chunk. If a chunk is too complex (contains too many objects, for example), then it is divided in half along each of the major planes, yielding eight equal-sized sub-chunks. Each sub-chunk is now treated like the original chunk and subdivided if too complex. This process is repeated until all chunks are sufficiently simple or a subdivision limit has been reached. The advantage is that finer subdivision can be afforded where and when needed because subdivision is much coarser where the scene space is empty or where there has been no ray activity. Since empty chunks are not subdivided, a ray needs to step through fewer chunks where there are no objects. The drawback is that stepping from one chunk to the next is more complex, since chunks are of different sizes.

Prior Art

U.S. Pat. No. 5,583,975 discusses scene subdivision for ray tracing. However it is limited to static and non-hierarchical subdivision of the scene volume, using a power of 2 subdivision in each dimension. It does discuss other subdivision techniques, but these are limited to 2D subdivision of the image plane, not the scene volume.

Scene subdivision for ray tracing is disclosed in U.S. Pat. No. 5,594,844, but is limited to non-hierarchical schemes where the scene volume is divided by an integer number of slices in each dimension. The invention is a means for determining what those integer dividing values for each dimension should be.

U.S. Pat. No. 5,933,146 discusses some amount of ray tracing hardware. However, it is limited to tracing multiple rays together as a group with a common pass through the scene database. It also only discusses the object hierarchy (bounding volumes) speedup method, not the space subdivision method.

Current ray tracing systems are unable to provide accelerated ray tracing. What is needed is a methodology and a device for incorporating the ray tracing process in a hardware implementation that provides fast and accurate image rendering.

SUMMARY OF THE INVENTION

An object of the invention includes an apparatus that performs the hierarchical space subdivision technique of accelerating a ray tracer, which can also be done dynamically. A preferred embodiment is a fully recursive and dynamic system employing an octree hierarchy. One point of novelty is that the implementation is accomplished through hard-wired electronics instead of software. The hard-wires implementation is designed with the accompanying adjustments to better suite the hardware implementation. A further object of the invention specifically claims caching of scene object descriptions, specific subdivision criteria, and other refinements.

An object of the invention is an apparatus to represent a ray tracing scene database using a directed acyclic graph, comprising a memory means for storing directed acyclic graph structures and scene data, wherein the directed acyclic graph structures and the scene data are individual data elements. There is a logic section for computing memory addresses of the directed acyclic graph structures and the scene data wherein the logic section processes the individual data elements such that the individual data elements are presented as the directed acyclic graph and scene objects to the ray tracing system.

A further object is a means of determining a sequence of directed acyclic graph nodes corresponding to a sequence of scene sub-spaces traversed by a ray.

Another object includes a means of maintaining statistical information for each of the directed acyclic graph nodes. Additionally, wherein the statistical information is used to derive a number of rays that have been traced through each of the directed acyclic graph nodes.

Yet another object is for an apparatus wherein the statistical information is used to derive a number of the rays that have intersected the scene objects in each of the directed acyclic graph nodes.

An object of the invention is an apparatus comprising a means for determining whether to collapse the directed acyclic graph nodes based upon the statistical information. An additional object is an apparatus comprising a means for determining whether to subdivide one of the directed acyclic graph nodes based upon the statistical information.

An additional object is an apparatus comprising a hardware means for determining which of the scene objects reside in subdivided directed acyclic graph nodes.

Another object includes an apparatus comprising a caching means for temporarily storing information about the scene objects retrieved from the memory means.

Yet another object is an apparatus comprising a means for combining a plurality of the directed acyclic graph nodes into a lesser number of the directed acyclic graph nodes.

A further object is an apparatus comprising a means for subdividing a single directed acyclic graph node into a plurality of subdivided directed acyclic graph nodes.

An object of the invention is an apparatus to represent a ray tracing scene database using an octree, comprising a memory means for storing octree structures and scene data, wherein the octree structures and the scene data are individual data elements. There is a logic section for computing memory addresses of the octree structures and the scene data wherein the logic section processes the individual data elements such that the individual data elements are presented as the octree and scene objects to the ray tracing system.

A further object is an apparatus comprising a means of determining a sequence of octree nodes corresponding to a sequence of scene sub-spaces traversed by a ray.

An additional object is an apparatus comprising a means of maintaining statistical information for each of the octree nodes.

Yet a further object is an apparatus wherein the statistical information is used to derive a number of rays that have been traced through each of the octree nodes. Furthermore, the present invention includes an apparatus wherein the statistical information is used to derive a number of the rays that have intersected the scene objects in each of the octree nodes.

And, an object of the invention is an apparatus comprising a means for determining whether to collapse the octree nodes based upon the statistical information. Also, an apparatus comprising a means for determining whether to subdivide one of the octree nodes based upon the statistical information.

Another object is an apparatus comprising a hardware means for determining which of the scene objects reside in subdivided octree nodes.

And yet another object is an apparatus comprising a caching means for temporarily storing information about the scene objects retrieved from the memory means.

One further object is an apparatus comprising a means for combining a plurality of the octree nodes into a lesser number of the octree nodes.

Additionally, an object is an apparatus comprising a means for subdividing a single octree node into eight subdivided octree nodes.

An object of the invention is a method of rendering an image by ray tracing, comprising subdividing a scene into a plurality of scene subspaces, wherein a plurality of scene objects reside within the scene subspaces. Another step is for storing directed acyclic graph information describing the scene and the scene objects. A final step includes processing the directed acyclic graph information in a logic unit and outputting the image.

Still other objects and advantages of the present invention will become readily apparent to those skilled in this art from the detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

DESCRIPTION OF THE PREFERRED EMBODIMENT

To those skilled in the art, the invention admits of many variations. The following is a description of a preferred embodiment, offered as illustrative of the invention but not restrictive of the scope of the invention.

Scope of the Invention Within a Ray Tracer

Figure 1:
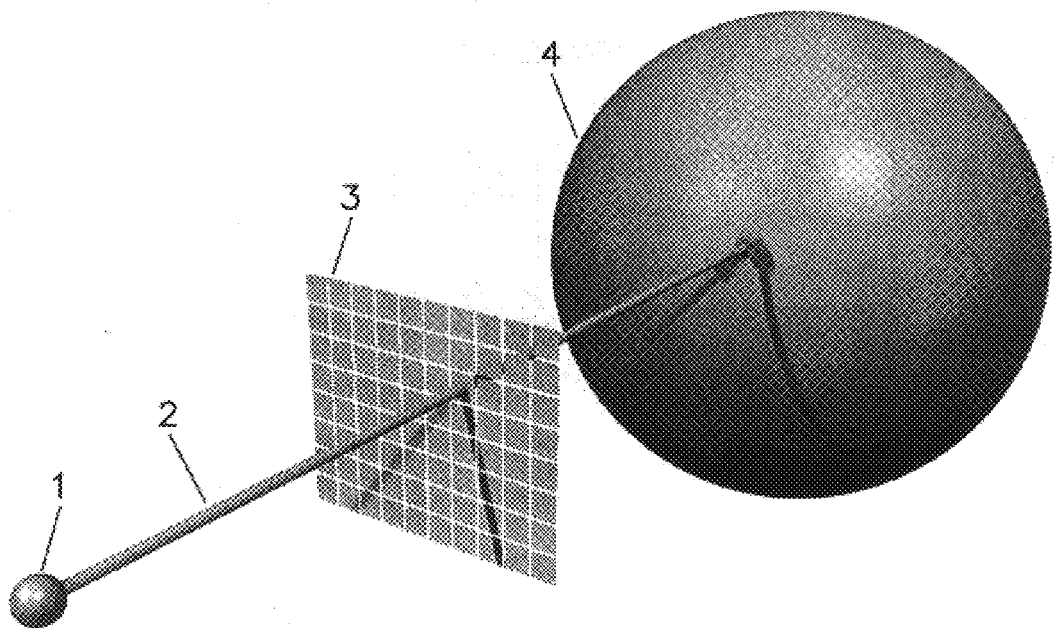
FIG. 1 a 3D diagram of the basic concept behind ray tracing.
Figure 2:
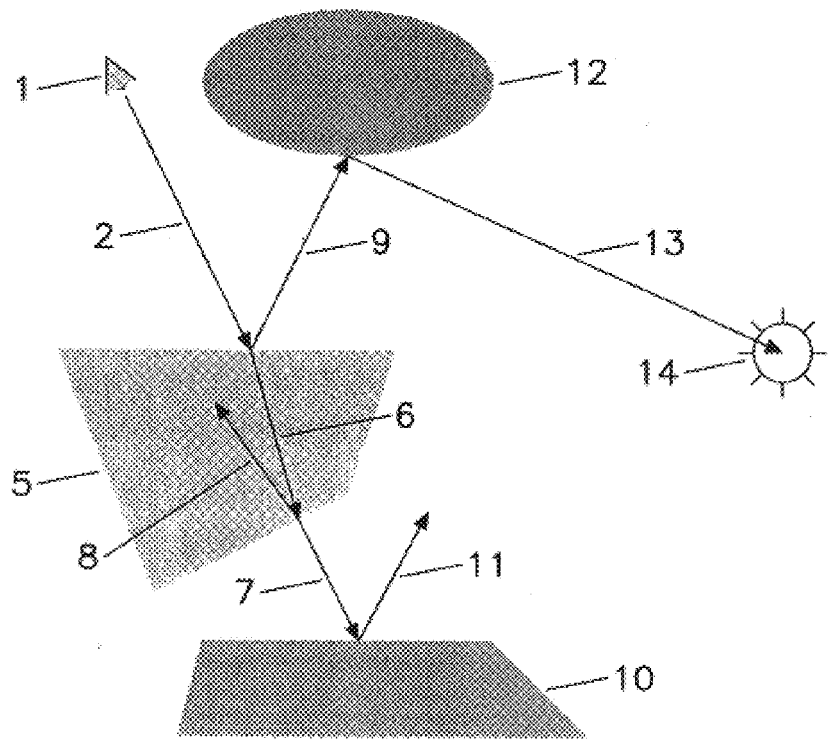
FIG. 2 a 2D diagram showing an example of how multiple levels of subordinate rays are traced in an effort to solve a single original ray. This method can be recursive.
Figure 3:
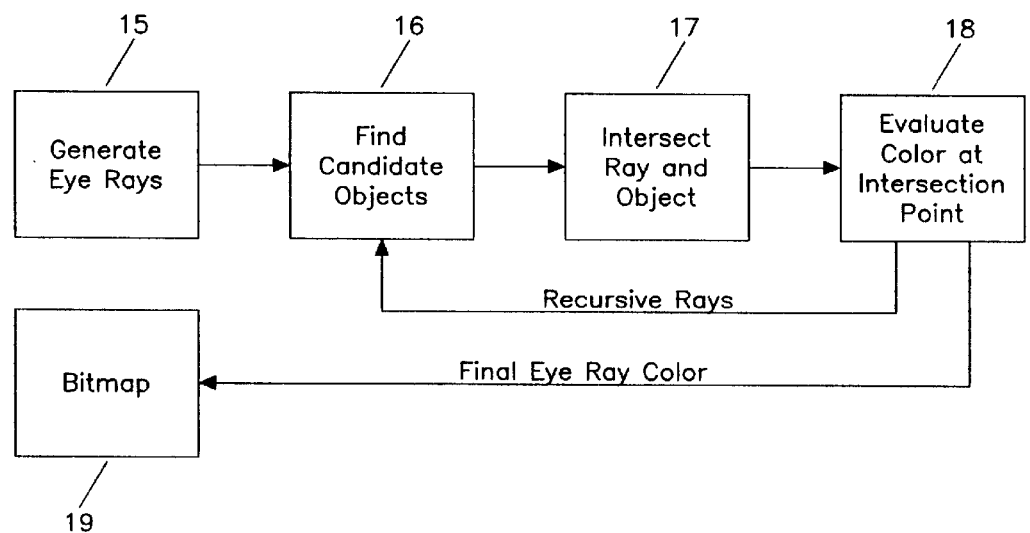
FIG. 3 an overall block diagram of a ray tracer.

FIG. 3 shows the ray tracing process at a high level. Block 15 generates the original eye rays that correspond to specific points in the bitmap. The scene image is essentially point sampled at each eye ray. It will be assumed a single eye ray at a time is being traced for the purposes of discussing the remainder of FIG. 3.

Block 16 finds candidate objects to check for intersection with the ray. This is where the speedup techniques discussed above are implemented. In a simplistic ray tracer, block 16 would present every object in the scene as a candidate for ray intersection.

Block 17 performs the intersection check between the ray and a candidate object from block 16. The result of the intersection check is communicated back to block 16 so that block 16 can decide whether additional objects must be checked. Checking additional objects may be necessary if these additional objects might intersect the ray closer to its origin. If no objects are found to intersect the ray, then the background color is determined for the ray.

Once the first intersection along a ray has been found, the ray and intersection information is passed to block 18 where the apparent color viewed along the ray is determined. Note that block 18 may generate and cause additional rays to be traced to determine the original ray's color. This process can be recursive. When the color of the original eye ray is eventually found, the bitmap 19 is updated appropriately.

One of the attributes of this invention is a novel means of implementing block 16 within a ray tracing system such as diagrammed in FIG. 3. More specifically, the invention implements block 16 as hard-wired electronics (as opposed to software) that implements the hierarchical space subdivision speedup method described above.

Directed Acyclic Graph (DAG)

The apparatus according to this invention maintains a directed acyclic graph of the scene volume. A "graph" in this context defines a relationship between "nodes". "Directed" means that the relationship between two adjacent nodes has a direction. In other words, each relationship has the notion of a "from" and "to". "Acyclic" means that a relationship can not be circular. No matter how many adjacent relationships you traverse from "from" to "to", you can never end up back at the starting node. As is commonly done in the art, the abbreviated term "DAG" will be substituted for the more cumbersome "directed acyclic graph".

In the preferred embodiment, the graph is further restricted to being a "tree". A tree graph is a subset of a DAG where a node may have no more than one "from" relationship, although it can have any number of "to" relationships. The name "tree" is commonly used for this type of DAG because the branching structure works just like a real tree in that there is one trunk that can have multiple branches, but each branch must originate from exactly one parent branch.

In the preferred embodiment, except for the top node, each node in the graph has exactly one parent. The top node has no parent, and represents the entire scene volume. Each node may have 0 or more child nodes. Nodes that have no child nodes are called "leaf" nodes, and nodes with child nodes are called "parent" nodes.

Figure 4:
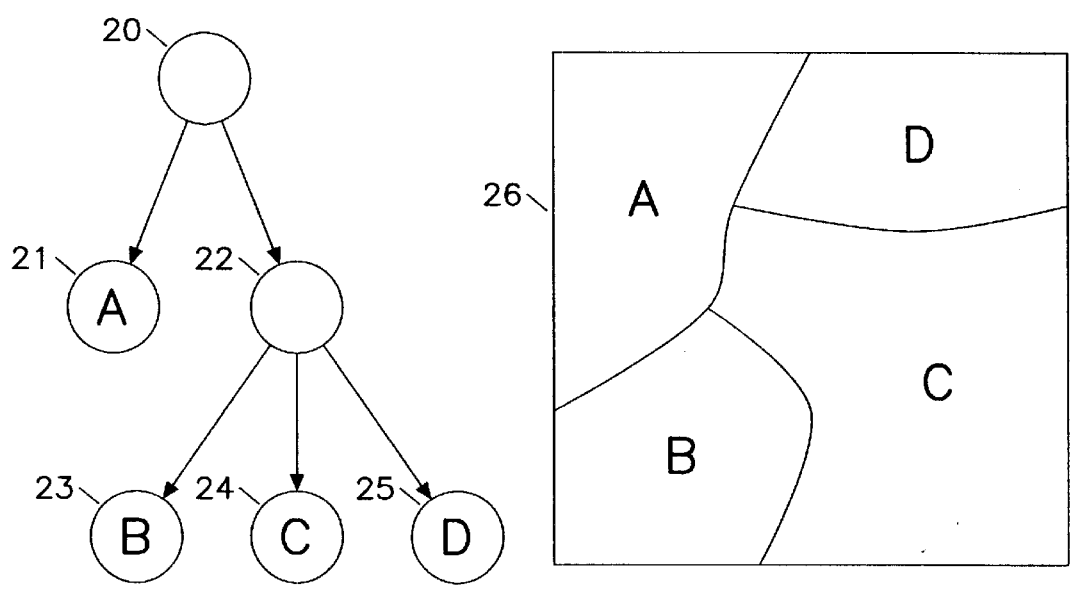
FIG. 4 shows the concept of subdividing the scene space according to a directed acyclic graph.

FIG. 4 shows an example of such a DAG for a 2 dimensional scene area instead of the real 3 dimensional scene volume. This was done because a 2 dimensional scene can be diagrammed much more clearly on paper. The DAG contains nodes 20–25. Node 20 is the top node, and represents the entire scene area 26. The top node contains nodes 21 and 22. Node 21 is a leaf node, and represents the scene area A. Node 22 is a parent node that represents the union of areas B, C, and D. Each of the remaining nodes 23–25 are leaf nodes representing the areas B, C, and D respectively.

In the DAG according to the preferred embodiment, parent nodes contain only links to one or more child nodes, and leaf nodes only contain references to zero or more scene objects. A leaf node must reference all the objects that could intersect a ray within the scene volume represented by that node.

Figure 5:
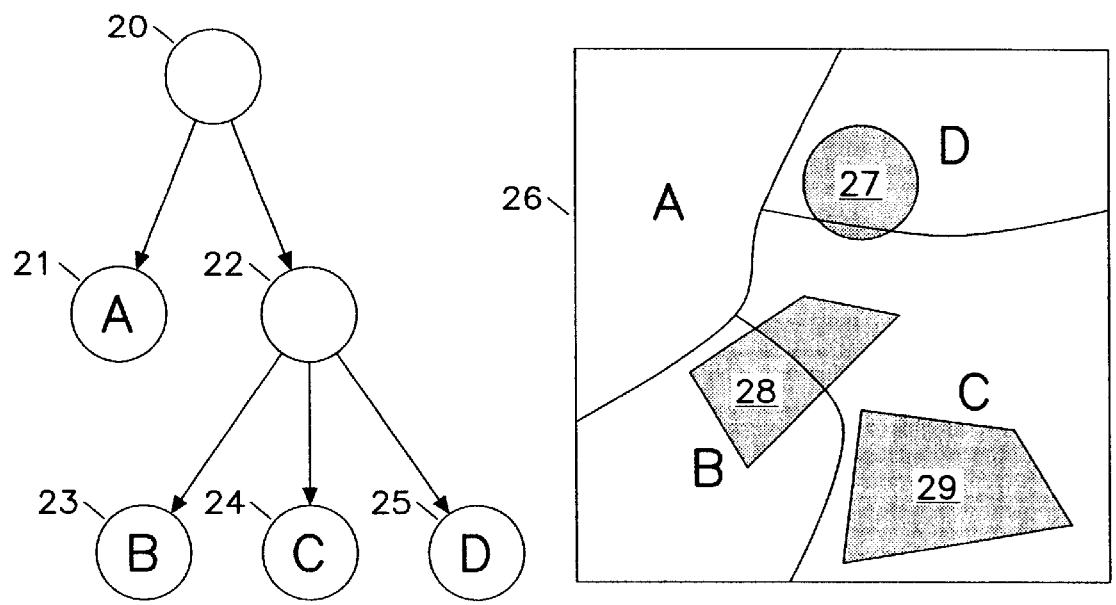
FIG. 5 is like FIG. 4 except that it shows objects in the scene space.

FIG. 5 is like FIG. 4, except that it shows the three objects 27–29 in the scene. In this example, node 21 is empty, node 23 references object 28, node 24 references objects 27, 28, and 29, and node 25 references object 27.

The definition of the scene objects are stored in memory that is external to the apparatus described by this invention. In the preferred embodiment, the DAG leaf nodes only contain references to these objects. These references are the starting addresses in memory of the scene object descriptions. In the preferred embodiment, the DAG data structures are also stored in this memory. The apparatus accesses the memory by generating the address to access, and then either reading or writing the data at that memory address. At a minimum, the apparatus must store one "root" address at which additional data is stored that eventually allows the apparatus to find the addresses of any part of the DAG data structures. In the preferred embodiment, this root address is the starting address of the data describing the top node.

In the preferred embodiment, the shape of the scene volume represented by each DAG node is convex. This yields the advantage that a ray will enter and exit the volume represented by any particular DAG node no more than once. In other words, no ray will never enter, exit, and then re-enter any volume represented by a DAG node.

In the preferred embodiment, the volumes represented by each DAG leaf node abut without overlap. Specifically the union of all the leaf node volumes is the entire scene volume, and the intersection between any two leaf node volumes is empty.

Ray Stepping

In a further refinement of the invention, the apparatus includes a means that can determine the sequence of scene sub-spaces traversed by a ray, and generate the sequence of corresponding DAG leaf nodes. In the preferred embodiment, the DAG data structures are stored in external memory. In that case, the apparatus generates a sequence of memory addresses, which refer to the DAG leaf nodes, which correspond to the scene subspaces traversed in order by a ray.

Figure 6:
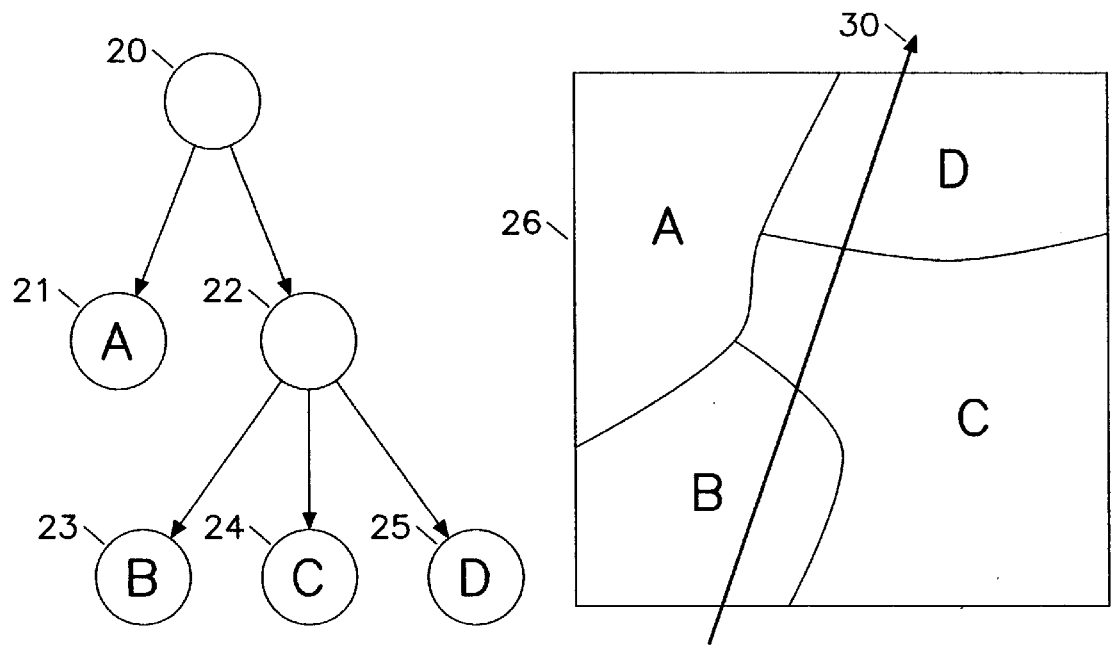
FIG. 6 shows a ray traversing a subdivided scene space.
Figure 7:
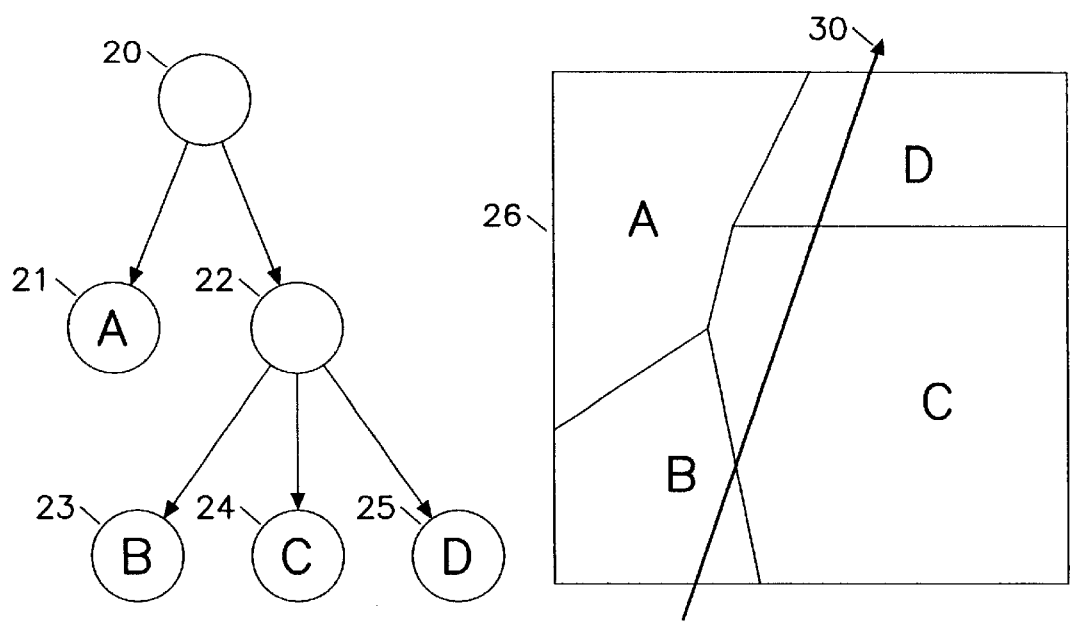
FIG. 7 shows a subdivided scene with convex subspaces.

This is illustrated in FIG. 6. The apparatus determines that subspaces B, C, and D, in that order, are traversed by ray 30. The apparatus therefore generates references to the DAG leaf nodes 23, 24, and 25 in that order. Note that a different orientation of ray 30 could have resulted in it traversing through space C two distinct times. This is not possible in the preferred embodiment because all volumes referenced by the DAG nodes are convex. FIG. 7 illustrates a 2 dimensional example of this. In this 2D diagram, each leaf node volume is a convex polygon, whereas in the real 3D case, each leaf node volume is a convex polyhedron.

Dynamic Subdivision

In a further refinement of the invention, the apparatus includes a means that can subdivide an existing DAG leaf node in response to a ray being traced through the scene space. Only non-empty leaf nodes are subdivided. When such a node is subdivided, it becomes a parent node and one or more child leaf nodes are created. Each child leaf node then represents a subset of the original node's scene volume, and will reference only those objects that could intersect a ray within it's subvolume.

Figure 8:
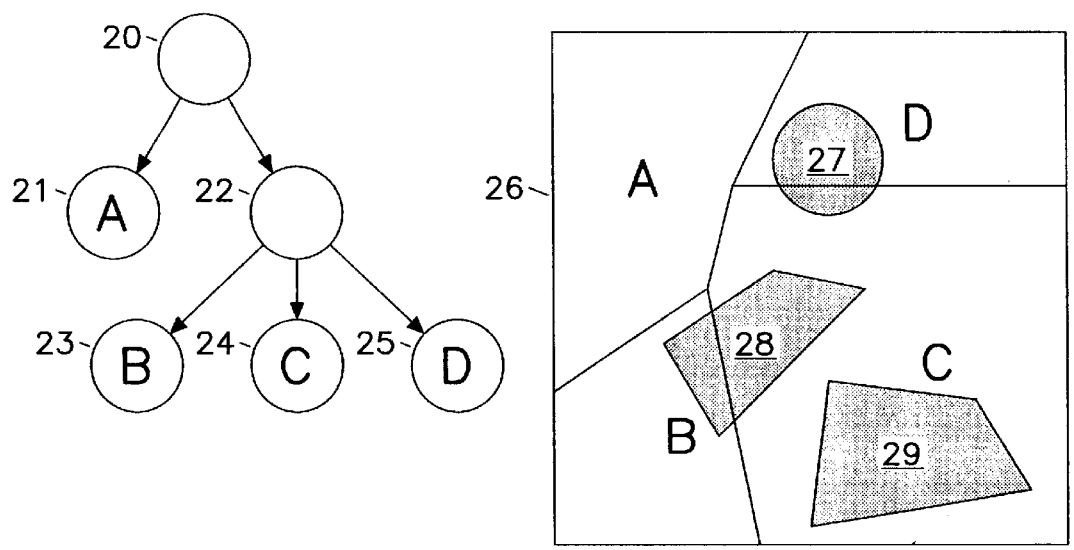
FIG. 8 shows a graph before a node is subdivided.
Figure 9:
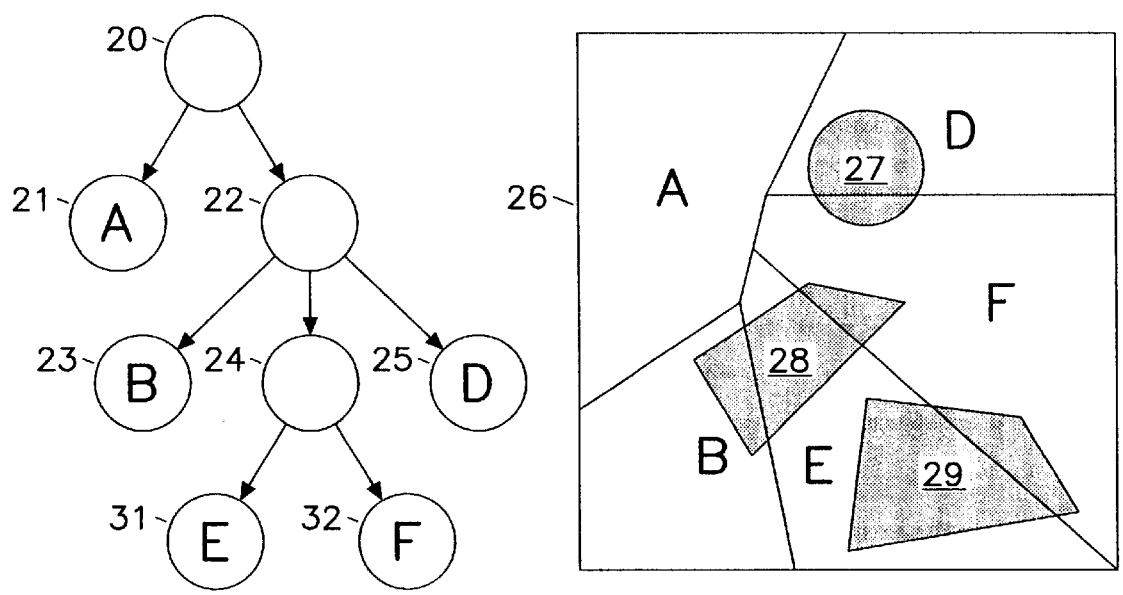
FIG. 9 shows a graph after a node is subdivided.
Figure 10:
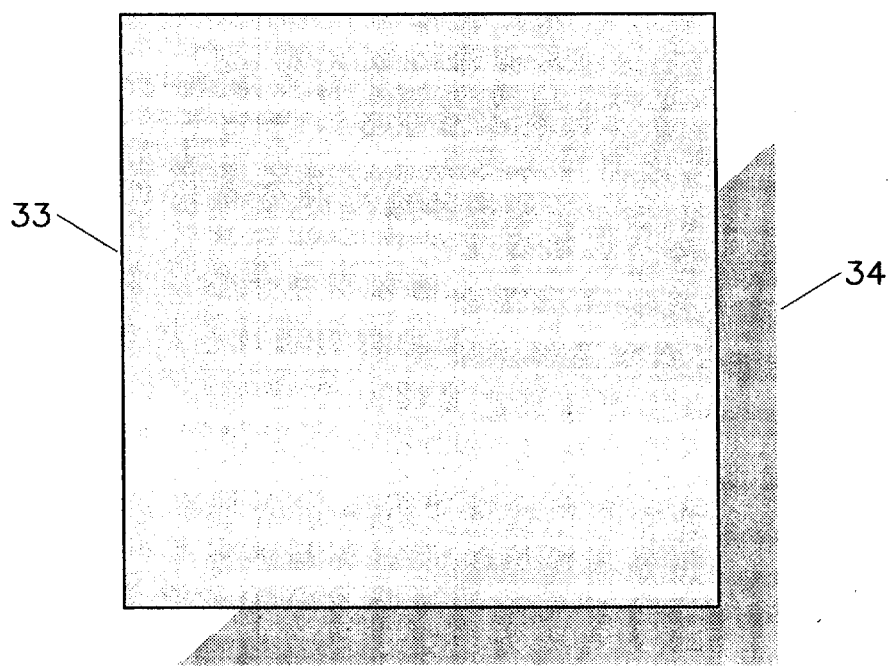
FIG. 10 illustrates a quadtree, the 2D analog of the 3D octree.
Figure 11:
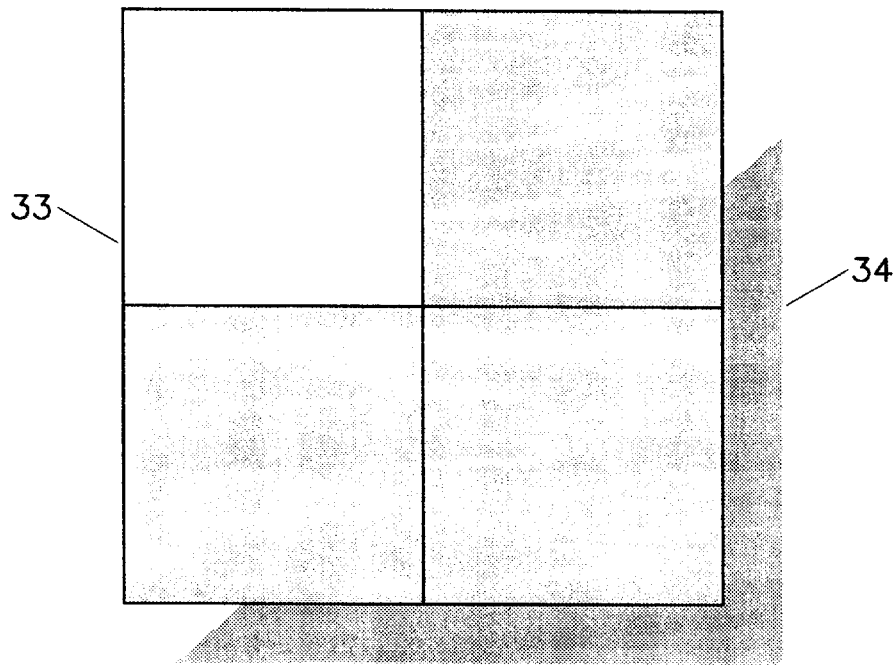
FIG. 11 illustrates a quadtree, the 2D analog of the 3D octree.
Figure 12:
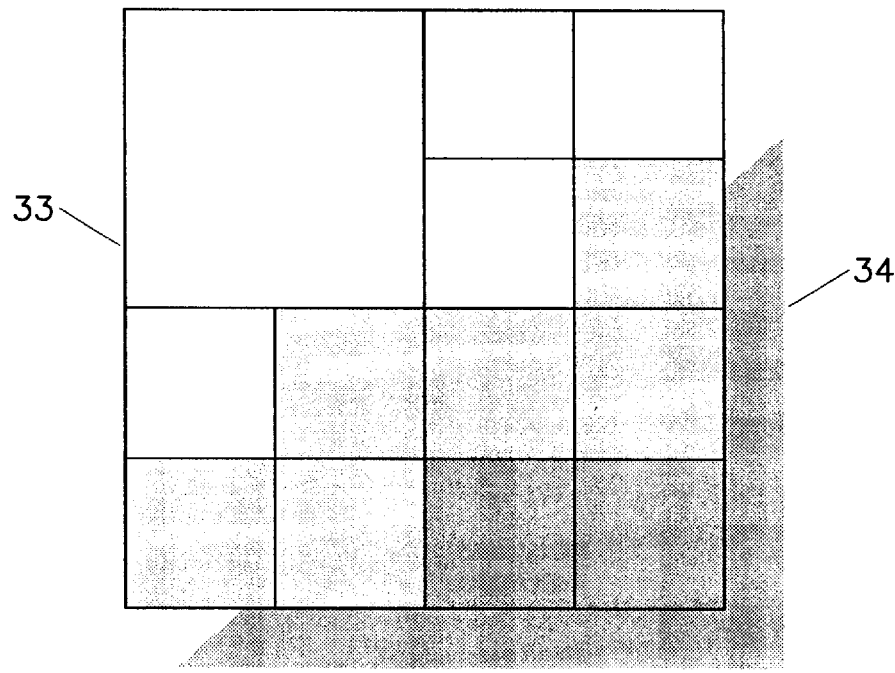
FIG. 12 illustrates a quadtree, the 2D analog of the 3D octree.
Figure 13:
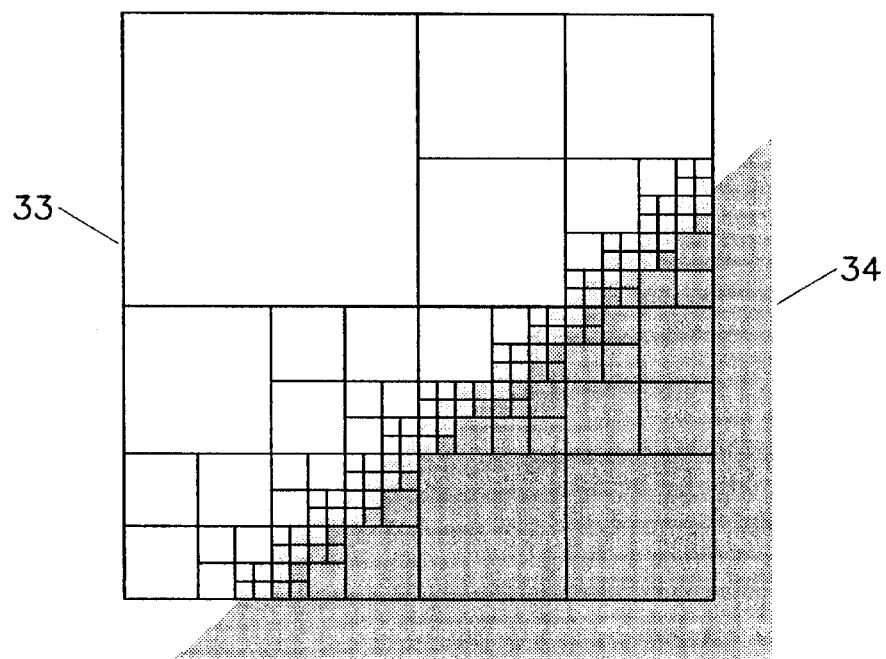
FIG. 13 illustrates a quadtree, the 2D analog of the 3D octree.

FIGS. 8 and 9 show the DAG and the associated scene space before and after such a subdivision. The area C corresponding to node 24 was subdivided into the two areas E and F. Node 24 thereby became a parent node with new child nodes 31 and 32. Node 24 originally referenced scene objects 27, 28, and 29. Node 31 now references objects 28 and 29, and node 32 references objects 27, 28, and 29. Note that in this example, the area C is subdivided into areas E and F in what is probably not an optimal division for the purposes of tracing future rays.

Some subdivision methods seek to balance the number of scene objects in each new subdivided volume, reduce the number of objects that appear in more than one subdivided volume, or otherwise attempt to subdivide based on the location of the scene objects. The preferred embodiment simply subdivides volumes according to pre-determined rules, and then determines which scene objects from the parent node end up in each subvolume.

In a further refinement of the invention, the apparatus includes a means that can determine whether any ray could ever intersect a particular scene object within the scene volume represented by a particular DAG node. In the absence of such a means, this determination would have to be performed externally to the apparatus if dynamic subdivision is employed. Note that this determination is essentially an intersection check between the node's scene subvolume and the scene object. In the preferred embodiment, the scene subvolumes are parallelepipeds and the scene objects are triangles. The exact algorithm for performing this intersection check in the preferred embodiment is described later.

Subdivision Criteria

In a further refinement of the invention, the apparatus includes a means that determines if and when a DAG node should be subdivided as described above. In the absence of such a means within the apparatus, a mechanism external to the apparatus would trigger a subdivision to occur. To make a reasonable decision as to if and when to subdivide a DAG node, the apparatus must maintain statistical information pertaining to each leaf node. Some of this statistical information may change dynamically as rays are traced through the scene volume. Subdivision criteria can then be applied to the statistical information to decide whether that DAG node should be subdivided.

In a further refinement of the invention, the statistical information at each leaf node allows the following information to be derived:
1) The number of rays that have been traced through the scene volume represented by the node.
2) The number of rays that were found to have intersected objects within the volume represented by the node.
3) The number of scene objects referenced by the node.

In the preferred embodiment, the criteria for deciding whether to subdivide a node are:
1) If the node's depth in the DAG is greater than a pre-set limit, then do not subdivide, else continue to step 2. A node's DAG depth is the number of levels it is down from the top node of the graph. In FIG. 9 this is the minimum number of arrows that must be followed from the top node 20 to get to the node in question. For example, the depth of node 23 is 2, of node 32 is 3, and of node 20 is 0.
2) If the node's depth in the DAG is less than a pre-set limit, then subdivide; else continue to step 3.
3) If the number of objects referenced by the node is more than a predetermined threshold then subdivide; else continue to step 4.
4) If the number of rays traced through the node that did not intersect any object within the node's space is less than a pre-determined threshold then do not subdivide, else continue to step 5.
5) If the ratio of rays that intersected objects within the node's volume to the total number of rays traced through the node's volume is greater than a predetermined threshold, then do not subdivide, else continue to step 6.
6) Subdivide.

Figure 18:
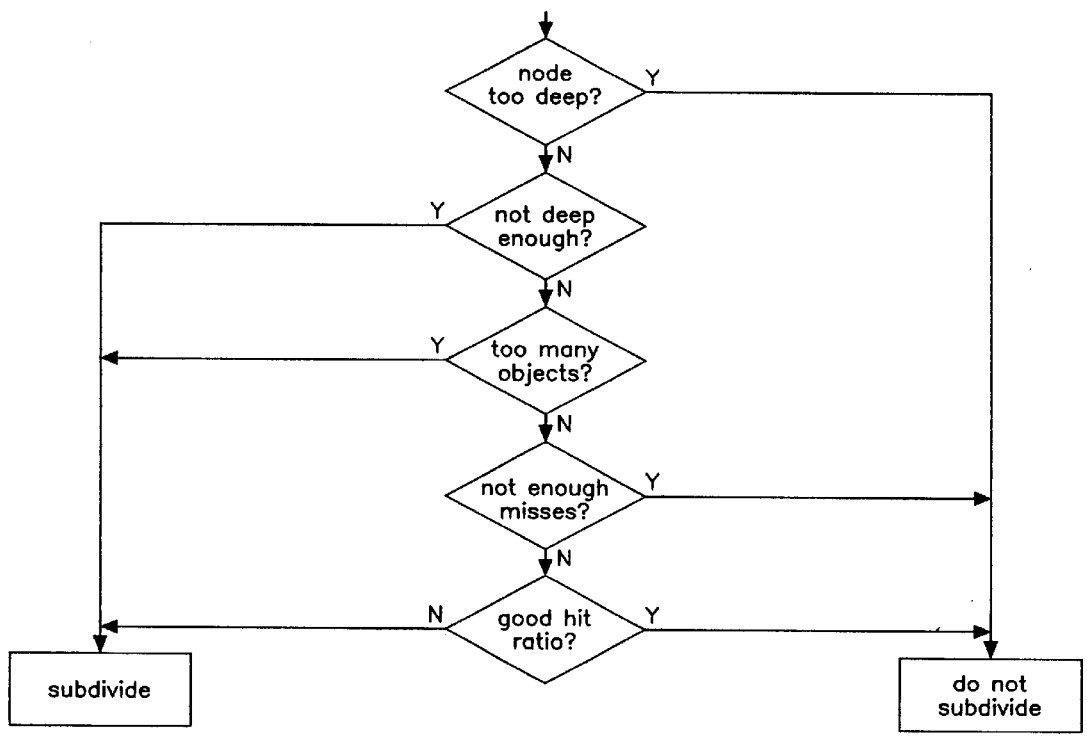
FIG. 18 is the flowchart for deciding whether a scene node should be subdivided.

Steps 1 and 2 allow maximum and minimum subdivision depths to be set. Step 3 causes subdivision if there are too many objects in the node's scene subvolume. Step 4 prevents further subdivision of little used scene subvolumes. Step 5 seeks to measure the "quality" of candidate objects listed in a node. It avoids additional subdivision if a sufficiently large fraction of rays traced through the subvolume already intersect one of its objects. This could be the case, for example, when a single large object fills most of the subvolume. If most rays that pass through that subvolume do hit the object, then it is probably not beneficial to subdivide the node further. This overall subdivision decision procedure of the preferred embodiment is shown visually but less rigorously in FIG. 18. Refer to the text above for the exact details.

Node Collapsing

In a further refinement of the invention, the apparatus includes a means to collapse a parent node and all its child nodes into a single leaf node. This is the opposite operation of subdividing a node, discussed above. One purpose of collapsing nodes is to reclaim memory and other system resources tied up by the nodes to be collapsed. A collapsed DAG structure is generally less efficient at finding candidate objects that might intersect a ray. However, overall system efficiency may be enhanced by collapsing a node due to the lower demand on system resources.

For example, many systems have a finite amount of "fast" memory (like dynamic RAM), which is backed up or "paged" to a slower but presumably larger and less expensive secondary memory (like a disk). Since the access time to the secondary memory can be many times the access time to the primary memory, it can be advantageous to forgo some DAG efficiency in return for reduced access to the secondary memory. In one embodiment of this invention, a doubly linked list is maintained of all parent nodes that contain only leaf nodes. Each such parent node contains a pointer to the next and previous node in the linked list. A node in this list is moved to the front of the list whenever the objects in any of its child nodes are presented as candidates for ray intersection. This results in the list being in order from most recently to least recently used. The last node on the list is always the node that is collapsed, at which time it is removed from the list. In one embodiment of this invention, nodes are collapsed from the end of the list if the overall DAG memory usage exceeds a pre-set threshold. DAG memory usage can increase because of other nodes being subdivided.

Scene Object Caching

Any embodiment of this invention that includes a means for determining whether a scene object could intersect a ray in a particular subvolume will need to read and act on a portion of the scene object description. The scene object descriptions are maintained externally to the apparatus, so the apparatus must be able to request and receive scene object descriptions.

In the preferred embodiment, the scene object descriptions are stored in a digital memory external to the apparatus. Requests to this memory may take some time to complete, and the completion of such requests may undesirably require additional external resources, such as memory bandwidth for example. In a further refinement of the invention, the apparatus includes a means of temporarily saving some amount of the scene object descriptions that have been requested. Furthermore, this apparatus monitors new request for scene object descriptions and completes the request without access to the external memory if the requested data is temporarily stored. When the total amount of scene object data requested exceeds that which can be temporarily stored, the apparatus also requires a means to decide what to do with the additional scene object data coming from the external memory. In the preferred embodiment, the data for the least recently used scene objects is deleted to make room for any new scene object data coming from the external memory. In this way, the temporary storage holds only the most recently requested scene object data, up to the capacity of that storage.

Octree

In a further refinement of the invention, the hierarchical volumes represented by the DAG is an octree. In this case, the top DAG node is a parallelepiped enclosing the scene space. When a leaf node is subdivided, it is always divided in half parallel to each of the three different sets of parallel faces. This yields eight subvolumes of identical shape and size. This concept is illustrated by the 2 dimensional diagrams of FIGS. 10–13. In two dimensions, the parallelepipeds become parallelograms (squares in the examples), and the octree becomes a quadtree. The scene area 33 is subdivided recursively to model the scene object 34.

Note that only non-homogeneous leaf nodes are subdivided. Leaf nodes that contain no objects, or leaf nodes that are completely filled with the interior of an object are not subdivided. Similarly in 3 dimensions, empty leaf nodes and leaf nodes completely within the interior of solid objects are not subdivided. In the preferred embodiment, the octree nodes represent scene volumes that are rectangular solids, with each face perpendicular to one of the three major axes.

Octree Coordinates

According to the preferred embodiment of the invention, the scene space is a rectangular, axis-aligned solid, which is subdivided dynamically as an octree. When a new ray to be traced is passed to the apparatus, it is transformed into the space where the whole of the scene volume encompassed by the octree occupies the cube from (0,0,0) to (1,1,1). These "octree coordinates" are then used as the ray is stepped from one adjacent voxel to the next. Octree voxels are identified by integer coordinates. These integers must have at least one bit for each possible subdivision level. For example, 16 bit integer coordinates allow up to 16 subdivision levels, for a total of 17 levels in the hierarchy. The bits in these integer coordinates are the "fraction bits" of the 0.0 to 1.0 coordinate within the octree. Using 4 bit integer coordinates as an example, the binary value 0000 would correspond to 0.0, 1000 to 0.5, and 0100 to 0.25. The purpose of this encoding scheme is to allow the leaf node voxel containing a coordinate to be found rapidly.

The procedure for doing so is:
1) Start at the root voxel. This is the voxel that corresponds to the entire scene volume.
2) Initialize the current bit position within the integer coordinates to the most significant bit.
3) If the current voxel is a leaf node, then it is the voxel containing the coordinate. If not, proceed to step 4.
4) Examine the bits at the current bit position of the three coordinate values. Each of these three bits indicates whether to select the "low" or "high" subvoxel in that dimension. Together, the three current bits identify which of the eight subvoxels contains the coordinate. Make this subvoxel the current voxel.
5) Move the current bit position within each integer coordinate value to the next less significant bit.
6) Repeat back to step 3.

Figure 14:
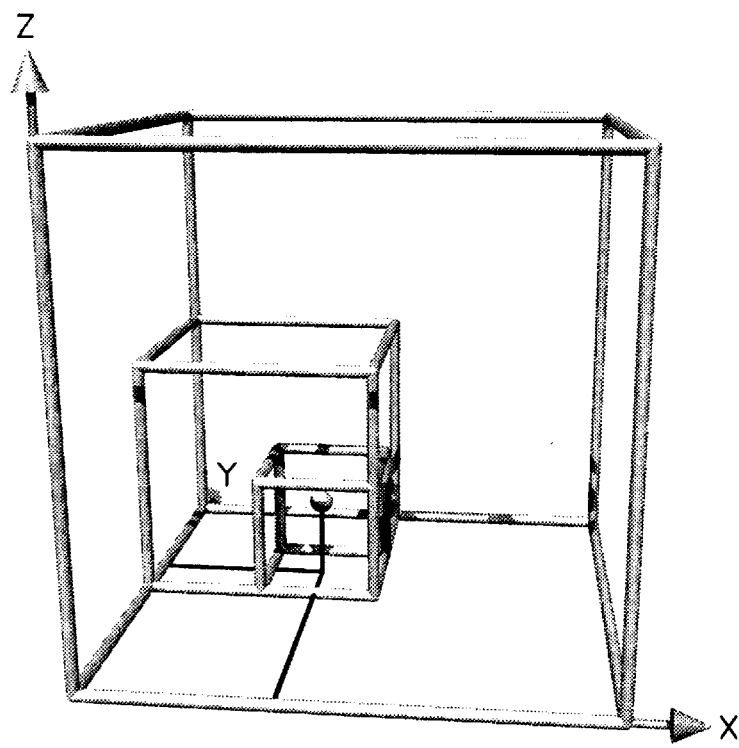
FIG. 14 shows the nested octree voxels that enclose a particular point within the scene space.
Figure 19:
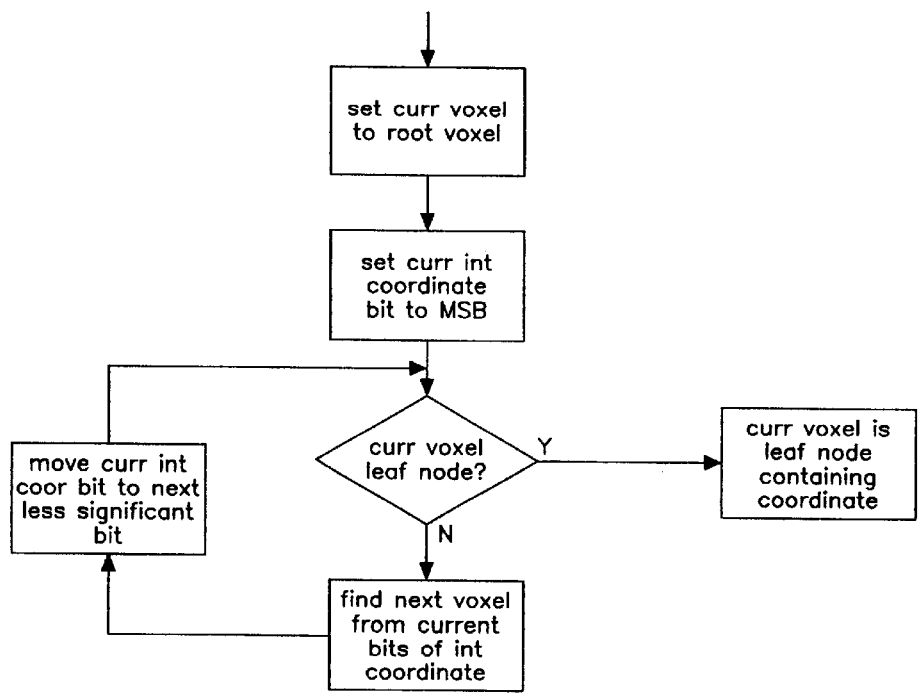
FIG. 19 is the flowchart for finding the leaf voxel containing a particular scene point.

A flow chart of this procedure is show in FIG. 19. The descriptions in the boxes are only intended to be reminders of each of the steps. Refer to the descriptions above for the details. As an example of this algorithm, imagine an octree where the X-axis increases east, the Y-axis north, and the Z-axis up. Four bit integer coordinates are used, although the deepest leaf voxel is currently only 2 levels down from the root. This example will find the voxel containing the coordinate (.37, .62, .17). First, the integer octree coordinate representation is found for these real coordinates. The binary integer coordinates are (0101, 1001, 0010). The current voxel is the root voxel, and the current bit position is 3 (most significant, numbered starting at 0 with the least significant bit). The current voxel (the root voxel) is not a leaf node, so the next subvoxel must be found. The current bits for each axis are X: 0, Y: 1, Z: 0. This indicates that the next subvoxel is in the west, north, down corner. This subvoxel now becomes the current voxel and the current bit position becomes 2. This is not a leaf voxel, so the next subvoxel must be found. The current bits for each axis are now X: 1, Y: 0, Z: 0. This identifies the subvoxel in the east, south, down corner. The current bit position becomes 1. This voxel is a leaf node, so this is the voxel containing the coordinate (.37, .62, .17). This example is illustrated in FIG. 14.

Voxel Stepping

According to the preferred embodiment of the invention, the apparatus contains a means to determine the next leaf node octree voxel in sequence along a ray. The general strategy for this is to determine the first integer octree coordinate outside the current voxel along the ray. Note that the ray will leave the current voxel by one of six faces. In the rare event that the ray leaves the voxel exactly (within the limits of the representation) by an edge or corner, it can be assumed to have left by any of the adjacent faces without causing any errors.

The current octree voxel is identified by the coordinate of its "low" corner. This means all the integer coordinate bits that are less significant than those needed to identify the voxel are zero. The first integer coordinate value to the "low" and "high" side of the voxel in each major axis direction can be found very easily from this representation. The next coordinate value in the low direction is simply the current voxel coordinate minus 1, since a voxel coordinate is the coordinate at its low corner. The next coordinate value in the high direction is the current voxel coordinate plus the size of the current voxel edge. Note that all voxels at the same subdivision hierarchy level have the same size, so this value is only dependant on the subdivision level of the current voxel. Furthermore, this edge size is always a number with a single 1 bit when expressed as an integer octree coordinate in binary. For example, assuming 4 bit binary integer octree coordinate values again, the edge size of the first level of subdivided voxel is 1000, the second level 0100, and the third level 0010. The current voxel edge size can therefore be easily maintained with minimal logic hardware as the octree is navigated up and down its levels. The value is shifted right one bit when going down a level, and shifted left one bit when going up a level.

The example illustrated by FIG. 14 will be expanded to provide an example of finding the next lower and higher integer coordinate out of the current voxel. The point at (0101, 1001, 0010) is known to be inside the current voxel, which is two levels down from the root voxel. Therefore, all integer coordinates with the same two most significant bits in each axis are in the same voxel. The voxel coordinate is the coordinate of any point within the voxel with all but the two most significant bits set-to zero, which is (0100, 1000, 0000). The edge size of this voxel is 0100, since it is two levels down from the root voxel. The next lower X coordinate is therefore 0100−1=0011, and the next higher X coordinate is 0100+0100=1000. The next voxel along the ray will have one of these six next higher or lower X, Y, or Z coordinates corresponding to each of the six voxel faces the ray could leave the voxel by. Note that the high or low coordinate choice for an axis can be made very simply from the sign of the ray direction for that axis. If the ray direction for an axis is positive, then the ray will never leave the voxel by the low face for that axis, and vice versa when the ray direction is negative. In the preferred embodiment, the ray direction (after transformation to the voxel (0,0,0) to (1,1,1) coordinate system) is stored in a standard binary representation where the most significant bit of each vector component directly indicates the sign of that component. When this "sign bit" is 1, the component value is negative, and the sign bit is 0 when the component value is positive or zero.

The purpose of the voxel stepping algorithm is to determine which of the six next higher or lower coordinate values will be used (which face the ray leaves the current voxel through), and to determine the coordinate values at that location for the remaining two axes.

The steps in the algorithm are:
1) For each of the three axes, create the next integer coordinate outside the current voxel. This is done by either adding the current voxel edge size to the current voxel coordinate if the sign bit of the ray direction for that axis is 0, or subtracting 1 from the current voxel coordinate if the sign bit is 1.
2) Find the ray distance to each of the three planes represented by the three values from step 1. As will be detailed later, this can always be done with one add and one multiply for each of the three planes. The ray distance is the distance along the ray from its origin.

3) For the plane that resulted in the shortest ray distance in step 2, compute the remaining two coordinate values to find the complete coordinate of the intersection between the ray and that plane.

4) Convert the coordinate from step 3 to the binary integer octree coordinate representation described in the "Octree Coordinates" section.

The resulting integer octree coordinate can be used to find the next voxel as previously described in the "Voxel Stepping" section.

Figures 15, 16:
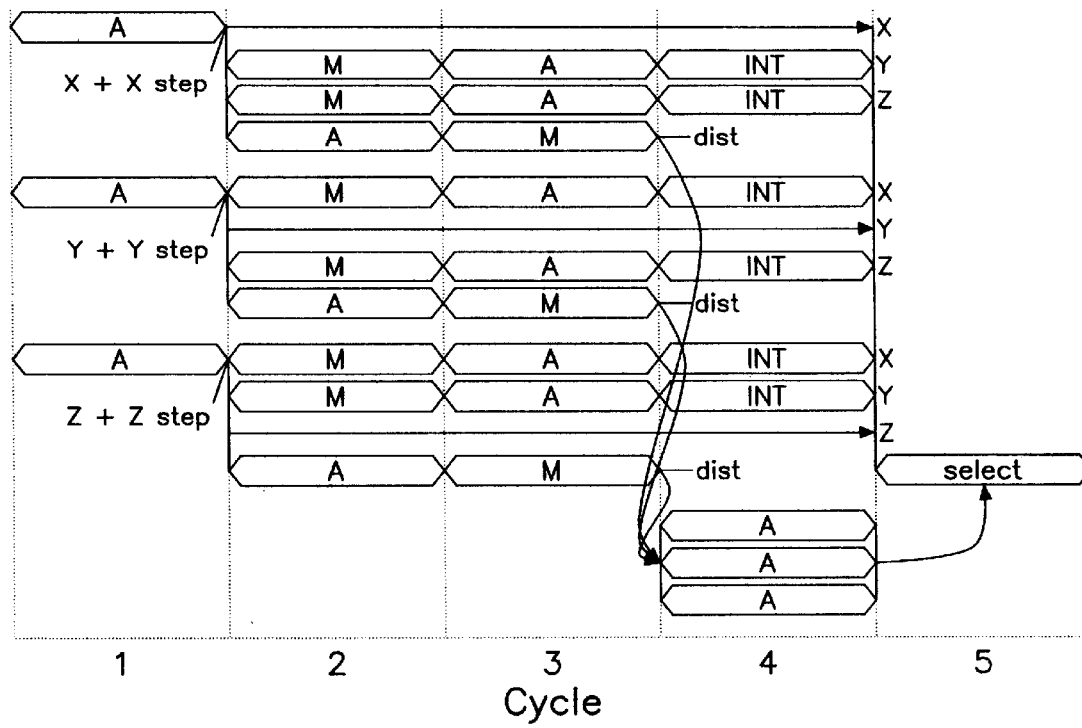
FIG. 15 shows the detailed data flow of a hardware implementation to find the next sequential octree voxel along a ray.
FIG. 16 shows the detailed derivation of some of the constants assumed in the data flow of FIG. 15.

FIG. 15 diagrams how this algorithm is carried out in hardware according to the preferred embodiment. In this case, each of the hardware operations is assumed to take one "cycle" of time. The diagram shows the operations performed at each cycle, and shows that the entire algorithm can be executed in 5 cycles. Each operation is labeled according to the type of operation performed. Add and subtract operations require substantially similar hardware, and are labeled "A". Multiply operations are labeled with "M", and conversion to integer operations are labeled "INT". The single "select" operation will be described shortly.

Step 1 of the algorithm is performed in the first cycle. Depending on the sign bit of the ray direction, either −1 or the edge size for the level of the current voxel is added to each component of the current voxel coordinate. The ray distances to the three resulting planes are computed in cycles 2 and 3. However, unlike the sequential algorithm described above, the resulting full coordinates for each of the three planes are computed in parallel with each other and with the ray distance. Therefore the three ray distances to each of the three planes, and the full X,Y,Z ray/plane intersection coordinates for each of the three planes are available by the end of cycle 3. In cycle 4, the three ray distances are compared to determine which is the smallest. This requires three subtract operations, shown at the bottom of cycle 4. Meanwhile also in cycle 4, the three ray/plane intersection points are converted to integers. Note that one coordinate component for each point need not be converted, since it was computed as an integer in cycle 1. At the end of cycle 4, all three possible next integer coordinates have been computed, and it has been determined which of these represents the shortest ray distance, and therefore the shortest ray increment. The selected integer coordinate is gated to the logic that will utilize it in cycle 5. Note that this may not require its own cycle in some implementations.

FIG. 15 shows that the ray distance to a point, given one of the coordinate component values of that point, can be found with one subtract and one multiply operation. This is done by starting with the coordinate component, subtracting the same component of the ray origin, and then dividing by that component of the ray direction unit vector. This does not actually require a divide operation in FIG. 15 because the reciprocal of each of the ray direction vector components are pre-computed for this purpose when the ray is first passed to the apparatus. When the component of the ray direction vector is too small to have a representable reciprocal, a sufficiently large number is substituted. This number must be large enough so that the minimum possible step size results in a computed distance increment larger than the outer octree dimensions. This is sufficient to prevent a step in that direction from ever being selected. Also note that since each distance is only computed for comparison with two other similarly computed distances, the overall scale of these distances is arbitrary. For example, it does not matter that the computed distance is 3.2 times larger than the true distance, as long as all the other computed distances are also 3.2 times larger. The comparisons to determine the smallest distance will still result in the correct choice. Since the scale of the computed distance is arbitrary, the ray direction vector need not be of unit length when the reciprocals are computed.

FIG. 15 shows that given one component of the coordinate of a point along a ray, the other two components can be found with one multiply and one add each. FIG. 16 shows what these multiply and add values are, and their derivation. Equation 35 shows how to find the coordinates of a point at a specified ray distance, and equation 36 shows how to find this ray distance given one of the coordinate components of the point. For the sake of the example in FIG. 16, it is assumed that the X component of the point coordinate is know, and is being used to find the Y component. Equation 37 results from replacing the ray distance in equation 35 with its equivalent according to equation 36. This is then rearranged into the general from of equation 38, with the resulting multiply and add values specified in equations 39. Note that both the multiply (m) and add (a) values are only a function of the ray definition. This allows them to be precomputed when the ray is passed to the apparatus, and treated as constants in FIG. 15.

The preceding example shows how to find the Y coordinate component given the X component. There are six separate sets of "m" and "a" values for all six possible combinations of starting and resulting coordinate components. FIG. 15 shows all six sets used in parallel during cycles 2 and 3. Note also that the solution for "m" and "a" require a divide by one of the components of the ray vector, which could be very small or zero. A number of large magnitudes can be safely substituted for the quotient. Because a similar substitution is made for the purpose of computing the ray distance in FIG. 15, the coordinate for a step in that direction will never be selected, and therefore the results of the coordinate computation will be irrelevant.

Note that each operation in the timing diagram of FIG. 15 is carried out in a hardware arithmetic unit. FIG. 15 shows the inputs and outputs of the operations, and their temporal relationship to each other, but does not show the actual hardware. In one embodiment of this invention, each operation in FIG. 15 is executed in a separate arithmetic unit dedicated just to that purpose. In other embodiments, single arithmetic units are re-used at different times to perform multiple like operations that do not overlap in time. The first method is generally faster. The second method generally requires less logic hardware, but can be slower and requires more control logic.

Figure 20:
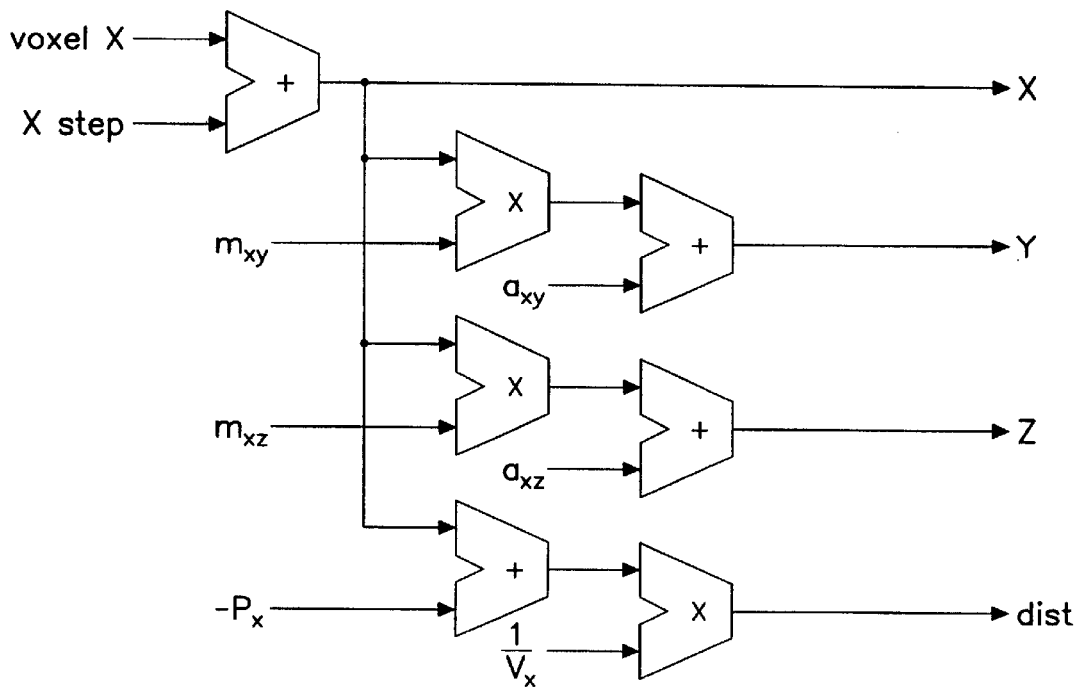
FIG. 20 shows a hardware implementation for finding the coordinate within the next voxel along a ray for the step along one axis. This corresponds to the top four lines of FIG. 15.

FIG. 20 illustrates one embodiment of how a portion of FIG. 15 translates into logic hardware. In this version, a separate dedicated arithmetic unit was used for each operation. FIG. 20 shows the hardware and connections required to find the coordinate and ray distance for the next coordinate out of the current voxel in the X direction. This corresponds to the top four rows of FIG. 15 for cycles 1–3. Other portions of FIG. 15 and other timing diagrams correlate to hardware in a similar manner.

Box Intersection

According to the preferred embodiment of the invention, the apparatus contains a means for determining the scene object lists of newly subdivided octree voxels, given the object list of the parent voxel. In the preferred embodiment, the scene objects are all triangles, and the octree voxels are all axis-aligned rectangular solids. The apparatus therefore requires a means to determine whether any part of a triangle is within an axis aligned box. The general strategy of determining this intersection is to start with the triangle, then successively clip it against the six planes of the box sides. What started as a triangle may grow by up to one vertex after each plane clip. If the number of vertices ever becomes zero, then the triangle does not intersect the box. If more than zero vertices remain after the last plane clip, then the triangle does intersect the box. Note that if the order of the plane clips is chosen carefully, this becomes a 2D problem after two plane clips, and the 1D problem after four plane clips. For example, if the original triangle is first clipped against the plane of the low X box face, then the high X box face, the X coordinates of the resulting polygon can be ignored, and are therefore not generated. Once that polygon has been additionally clipped against the planes of the low and high Y faces, the Y coordinates are no longer needed. At this point only the Z coordinates are examined to determine whether any part of the original object remains within the high to low Z interval of the box.

Figure 17:
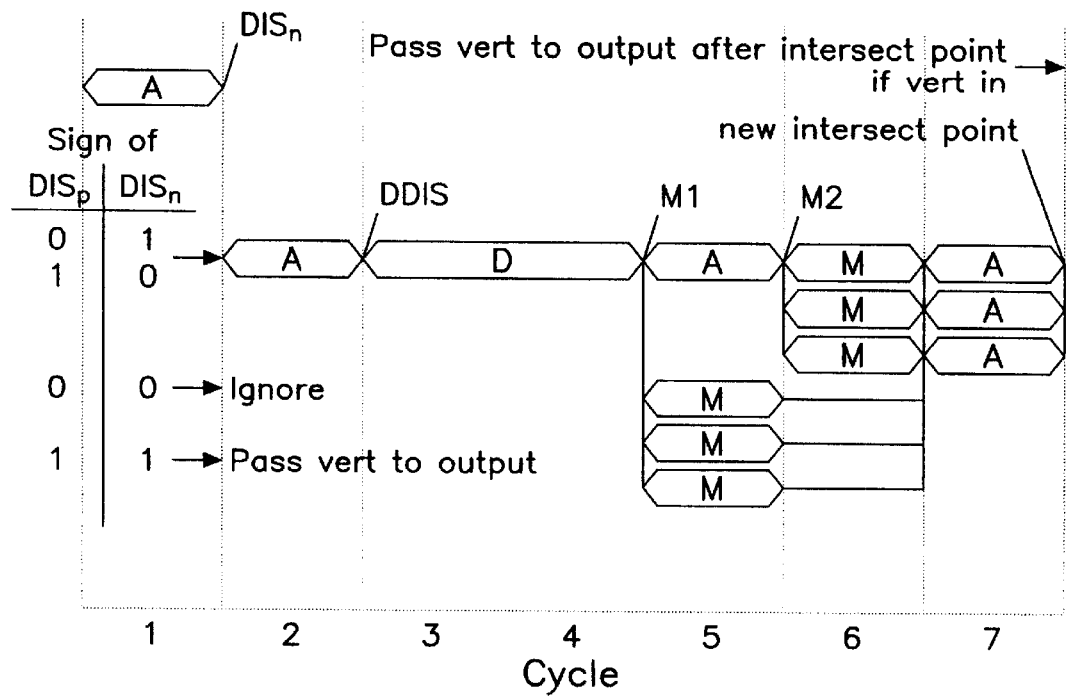
FIG. 17 shows the detailed data flow of a hardware implementation of one plane clip stage used in determining whether a triangle intersects an octree voxel.

FIG. 17 shows a full 3D-clip stage. Other subsequent stages are subsets of this one. As in FIG. 15, "A" denotes an add or subtract operation, and "M" a multiply. "D" is used to indicate a divide, which is assumed to require twice as long as either an add or multiply. The list of polygon vertices are processed by this plane clip stage one vertex at a time. For the sake of the example, it will be assumed that this is the first of the six clip stages, and that this stage is clipping against the plane of the low X face of the box. As a new current vertex of the polygon is started, the X clip value is subtracted from the X component of the current vertex to yield the signed distance of the vertex from the clip plane, denoted as "DISn" in FIG. 17. The sign of DISn indicates whether this polygon vertex is on the "in" or "out" side of the plane.

In the preferred embodiment, a standard binary representation for DISn is used such that a single sign bit is 1 if the value is negative, or 0 if the value is zero or positive. The sign bit of the current vertex to clip plane distance (DISn), and the sign bit of the previous vertex to clip plane distance (DISp) are used to determine what is done next. The four possibilities are shown on the chart at the left side of FIG. 17. If both sign bits are 0, meaning both vertices are clipped off, then the current vertex is ignored, resulting in no vertex passed to the next clip stage. If both sign bits are 1, then both vertices are "in", and the current vertex is passed to the next stage immediately without any additional computation. If the sign bits differ, then a new vertex must be created at the intersection of the previous polygon edge and the clip plane. In this case, 6 additional cycles of computation are performed to create the vertex at the plane intersection.

In cycle 2, the X components of the previous and current polygon vertices are subtracted to yield the X distance between the two vertices. In cycles 3 and 4, DISn is divided by this X distance between the two vertices, yielding M1. M2 is computed as 1−M1 in cycle 5. M1 and M2 are the "weighting" factors for blending the current and previous vertex to obtain the new plane intersection point. The previous vertex is weighted (multiplied by) M1 in cycle 5, and the current vertex is weighted by M2 in cycle 6. The results of these two operations are summed in cycle 7 to yield the new vertex at the plane intersection point, which is passed as the next polygon vertex to the next plane clip stage. After this is done, the current vertex is also passed to the next plane clip stage if it is on the "in" side of the plane (sign of DISn is 1). Note that there are a number of possible small variations of the algorithm shown in FIG. 17. Various tradeoffs can be made between using more hardware and requiring fewer cycles. For example, everything in cycles 2–7 could be moved up one cycle earlier, but requires two separate add units in cycle 1 As shown, a single add unit could be shared between the adds shown in cycles 1 and 2. Also, M2 could be computed in parallel with M1, which requires additional add and divide units.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. An apparatus to represent a ray tracing scene database using a directed acyclic graph, comprising:
    a memory means for storing directed acyclic graph structures and scene data, wherein said directed acyclic graph structures and said scene data are individual data elements;
    a means for determining a sequence of directed acyclic graph nodes corresponding to a sequence of scene sub-spaces traversed by a ray; and
    a logic section coupled to said memory means for computing memory addresses of said directed acyclic graph structures and said scene data wherein said logic section processes said individual data elements such that said individual data elements are presented as said directed acyclic graph and scene objects to said ray tracing system.

2. An apparatus according to claim 1, further comprising a means of maintaining statistical information for each of said directed acyclic graph nodes.

3. An apparatus according to claim 2, wherein said statistical information is used to derive a number of rays that have been traced through each of said directed acyclic graph nodes.

4. An apparatus according to claim 2, wherein said statistical information is used to derive a number of said rays that have intersected said scene objects in each of said directed acyclic graph nodes.

5. An apparatus according to claim 2, further comprising a means for determining whether to collapse said directed acyclic graph nodes based upon said statistical information.

6. An apparatus according to claim 1, further comprising a hardware means for determining which of said scene objects reside in subdivided directed acyclic graph nodes.

7. An apparatus according to claim 6, further comprising a caching means for temporarily storing information about said scene objects retrieved from said memory means.

8. An apparatus according to claim 1, further comprising a means for combining a plurality of said directed acyclic graph nodes into a lesser number of said directed acyclic graph nodes.

9. An apparatus according to claim 1, further comprising a means for subdividing a single directed acyclic graph node into a plurality of subdivided directed acyclic graph nodes.

10. An apparatus to represent a ray tracing scene database in hardware using an octree, comprising:
    a memory means for storing octree structures and scene data, wherein said octree structures and said scene data are individual data elements;
    a means of determining a sequence of octree nodes corresponding to a sequence of scene sub-spaces traversed by a ray; and
    a logic section coupled to said memory means for computing memory addresses of said octree structures and said scene data wherein said logic section processes said individual data elements such that said individual data elements are presented as said octree and scene objects to said ray tracing system.

11. An apparatus according to claim 10, further comprising a means of determining a sequence of octree nodes corresponding to a sequence of scene sub-spaces traversed by a ray.

12. An apparatus according to claim 10, further comprising a means of maintaining statistical information for each of said octree nodes.

13. An apparatus according to claim 12, wherein said statistical information is used to derive a number of rays that have been traced through each of said octree nodes.

14. An apparatus according to claim 12, wherein said statistical information is used to derive a number of said rays that have intersected said scene objects in each of said octree nodes.

15. An apparatus according to claim 12, further comprising a means for determining whether to collapse said octree nodes based upon said statistical information.

16. An apparatus according to claim 12, further comprising a means for determining whether to subdivide one of said octree nodes based upon said statistical information.

17. An apparatus according to claim 10, further comprising a hardware means for determining which of said scene objects reside in subdivided octree nodes.

18. An apparatus according to claim 17, further comprising a caching means for temporarily storing information about said scene objects retrieved from said memory means.

19. An apparatus according to claim 10, further comprising a means for combining a plurality of said octree nodes into a lesser number of said octree nodes.

20. An apparatus according to claim 10, further comprising a means for subdividing a single octree node into eight subdivided octree nodes.

21. A method of rendering an image in hardware by ray tracing, comprising the steps of:

subdividing a scene into a plurality of scene subspaces, wherein a plurality of scene objects reside within said scene subspaces;

determining a sequence of directed acyclic graph nodes corresponding to a sequence of scene sub-spaces traversed by a ray;

subdividing the directed acyclic graph nodes based upon statistical information;

storing directed acyclic graph information describing said scene and said scene objects;

processing said directed acyclic graph information in a logic unit; and outputting said image.

* * * * *